US006816941B1

United States Patent
Carlson et al.

(10) Patent No.: US 6,816,941 B1
(45) Date of Patent: Nov. 9, 2004

(54) METHOD AND SYSTEM FOR EFFICIENTLY IMPORTING/EXPORTING REMOVABLE STORAGE VOLUMES BETWEEN VIRTUAL STORAGE SYSTEMS

(75) Inventors: Wayne Charles Carlson, Tucson, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 09/694,724

(22) Filed: Oct. 23, 2000

(51) Int. Cl.[7] .............................................. G60F 12/00
(52) U.S. Cl. ....................................................... 711/111
(58) Field of Search ........................ 711/111, 115, 112, 711/113

(56) References Cited

U.S. PATENT DOCUMENTS

| | | |
|---|---|---|
| 4,939,598 A | 7/1990 | Kulakowski et al. |
| 5,034,914 A | 7/1991 | Osterlund |
| 5,121,483 A | 6/1992 | Monahan et al. |
| 5,222,217 A | 6/1993 | Blount et al. |
| 5,283,884 A | 2/1994 | Menon et al. |
| 5,327,535 A | 7/1994 | Ogata et al. |
| 5,388,260 A | 2/1995 | Monahan et al. |
| 5,546,557 A | 8/1996 | Allen et al. |
| 5,584,008 A | 12/1996 | Shimada et al. |
| 5,613,082 A | 3/1997 | Brewer et al. |
| 5,613,097 A | 3/1997 | Bates et al. |
| 5,754,888 A * | 5/1998 | Yang et al. .................... 710/52 |
| 6,049,848 A * | 4/2000 | Yates et al. ..................... 711/4 |
| 6,098,148 A * | 8/2000 | Carlson ....................... 711/112 |
| 6,182,191 B1 * | 1/2001 | Fukuzono et al. .......... 711/111 |

* cited by examiner

*Primary Examiner*—Matthew Kim
*Assistant Examiner*—Shane M Thomas
(74) *Attorney, Agent, or Firm*—Robert M. Sullivan; Dillon & Yudell LLP

(57) ABSTRACT

A method and system for efficiently importing/exporting a removable storage volume having a number of data files from a first virtual storage system to a second virtual storage system. The method includes writing a table of contents to the end of the removable storage volume in the first virtual storage system. The table of contents uniquely identifies the data files residing in the removable storage volume. Next, the removable storage volume is transferred to the second virtual storage system. Upon receipt of the removable storage volume, the second virtual storage system updates a database in the second virtual storage system utilizing the information contained in the table of contents without having to read each of the data files in the removable storage volume. In a related embodiment, for each of the data file in the removable storage volume, the table of contents includes a filename, starting record on the removable storage volume and number of records in the data file.

16 Claims, 4 Drawing Sheets

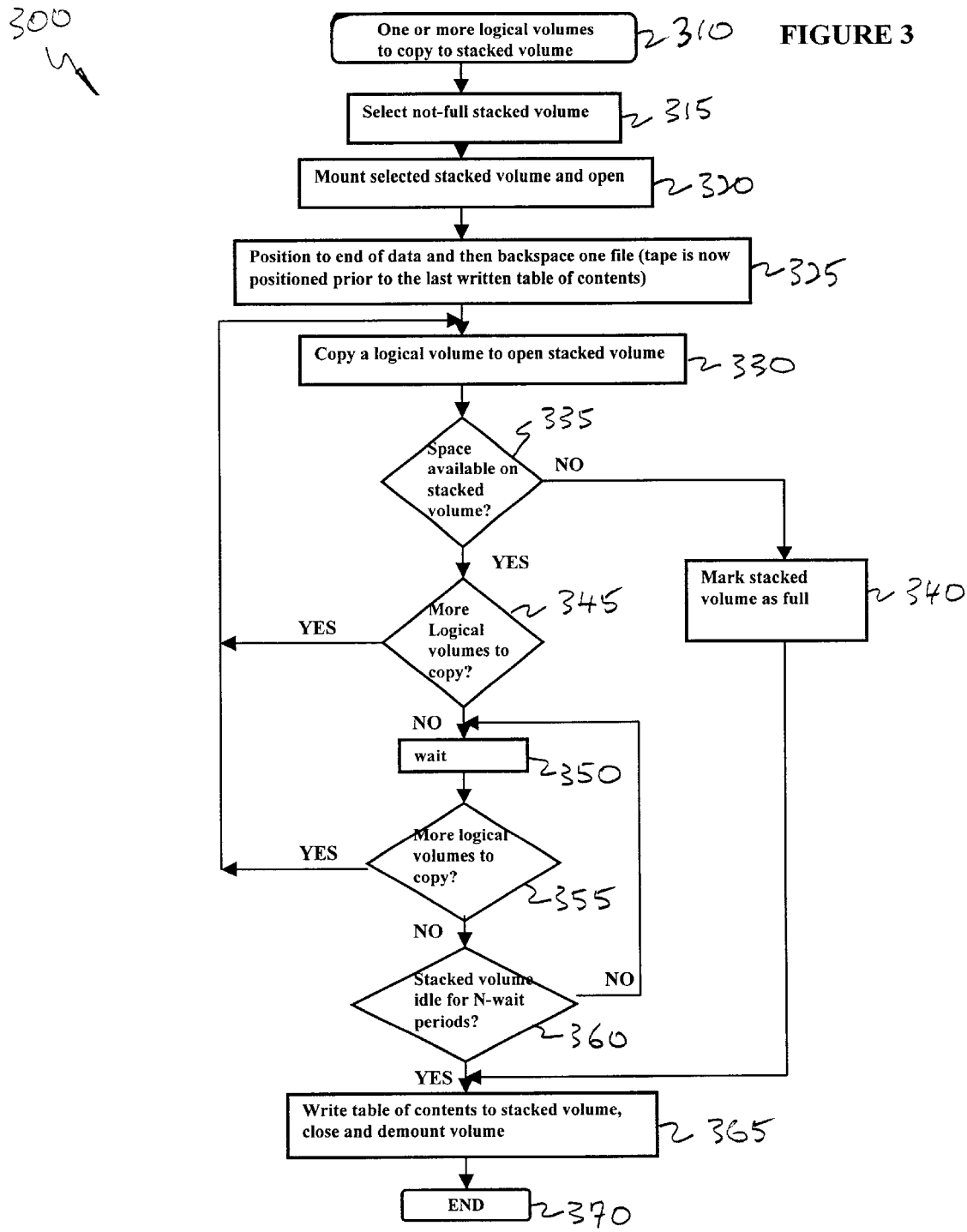

METHOD AND SYSTEM FOR EFFICIENTLY IMPORTING/EXPORTING REMOVABLE STORAGE VOLUMES BETWEEN VIRTUAL STORAGE SYSTEMS

CROSS REFERENCE TO RELATED APPLICATIONS

The present application is related to the following copending U.S. patent application Ser. No. 09/694,750 filed concurrently on Oct. 23, 2000, entitled "Method and System Utilizing Data Fragments for Efficiently Importing/Exporting Removable Storage Volumes." The above-mentioned patent application is assigned to the assignee of the present application.

BACKGROUND OF THE INVENTION

1. Technical Field

The present invention relates in general to data storage and processing and, in particular to virtual storage systems. More particularly, the present invention relates to a method and system for efficiently importing/exporting removable storage volumes between virtual storage systems.

2. Description of the Related Art

In hierarchical virtual storage systems, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

One such hierarchical storage system is a virtual tape storage system (VTS), including a host data interface, a DASD, and a number of tape devices. When the host writes a logical volume, or a file, to the VTS, the data is stored as a file on the DASD. Although the DASD provides quick access to his data, it will eventually reach full capacity and a backup or secondary storage system will be needed. An IBM 3590 tape cartridge is one example of a tape device that could be used as a backup or secondary storage system When the DASD fills to a predetermined threshold, the logical volume data for a selected logical volume is then appended onto a tape cartridge, or a physical volume, with the original left on the DASD for possible cache hits. When a DASD file has been appended to a tape cartridge and the original remains on the DASD, the file is "premigrated."

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Typically, a database containing information that links the logical volumes to their corresponding physical tape volume is maintained by the VTS. Generally, the database is maintained and backed up separately from the data tapes. This database, however, does not store the actual logical volume name, instead it utilizes a reference number for the logical volume name. This makes it difficult to quickly import and export to and from a VTS because all the data files must be typically be read by the receiving VTS, in the case of an import operation, to generate the information that links the logical volumes to their corresponding physical data tape for the receiving VTS database.

Accordingly, what is needed in the art is an improved method for importing/exporting data tapes from one VTS to another VTS that mitigates the above-discussed limitations in the prior art. More particularly, what is needed in the art is an improved method for importing/exporting data tapes that does not require the receiving VTS to read every data file in the imported data tapes to generate the information that links the logical volumes to their corresponding physical tape volume.

SUMMARY OF THE INVENTION

It is therefore an object of the invention to provide an improved virtual storage system.

It is another object of the invention to provide a method and system for efficiently importing/exporting removable storage volumes between virtual storage systems.

To achieve the foregoing objects, and in accordance with the invention as embodied and broadly described herein a method and system for efficiently importing/exporting a removable storage volume having a number of data files from a first virtual storage system to a second virtual storage system is disclosed. The method includes writing a table of contents to the end of the removable storage volume in the first virtual storage system. The table of contents uniquely identifies the data files residing in the removable storage volume. Next, the removable storage volume is transferred to the second virtual storage system. Upon receipt of the removable storage volume, the second virtual storage system updates a database in the second virtual storage system utilizing the information contained in the table of contents without having to read each of the data files. In a related embodiment, for each of the data file in the removable storage volume, the table of contents includes a filename, starting record on the removable storage volume and number of records in the data file and the table of contents is written to the end of the removable storage volume when the removable storage volume is closed. In another advantageous embodiment, the table of contents further includes a timestamp that provides a means of determining when the data files were written to the removable storage volume.

In another embodiment of the present invention, the table of contents is written to the end of the removable storage volume after the removable storage volume has been idle for a period of time. This has the added advantage that if an intervening system crash occurs before the removable storage volume is filled, the table of contents in the partially filled removable storage volume can be utilized to restore a database that contains the information detailing the links between the logical and physical volumes.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 illustrates a high-level process flow diagram for writing to a removable storage volume utilizing the principles disclosed by the present invention.

DETAILED DESCRIPTION OF THE PREFERRED EMBODIMENT

Figure 1:
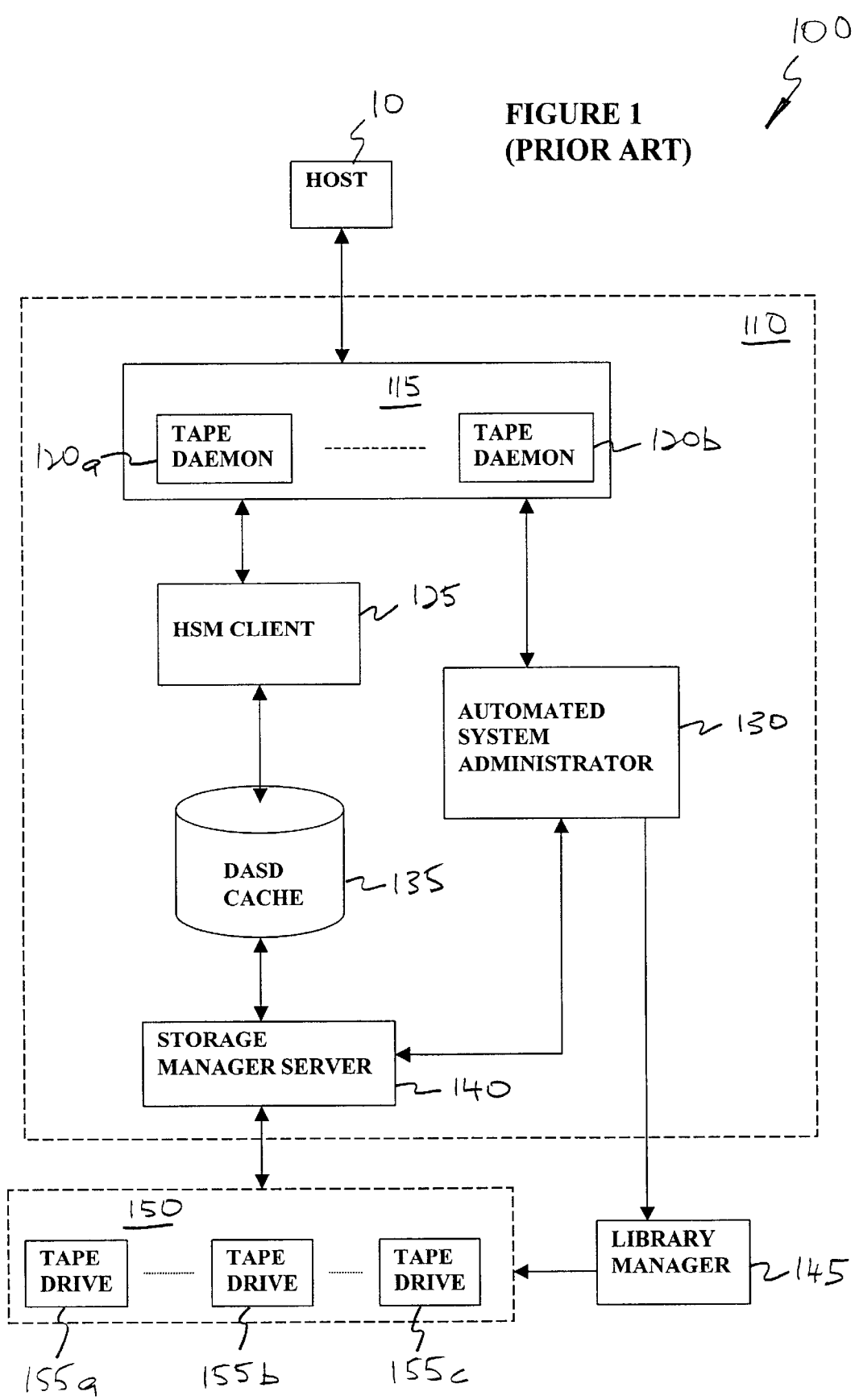
FIG. 1 illustrates a block diagram of an exemplary virtual storage system that provides a suitable environment for the practice of the present invention.

With reference now to the figures and in particular with reference to FIG. 1, there is depicted a block diagram of an exemplary virtual storage system 100 that provides a suitable environment for the practice of the present invention. Virtual storage system 100 includes a virtual tape server 110, a tape library 150 and a library manager 145. A host system 10 is linked to virtual tape server 110 via a network connection, e.g. TCP/IP, LAN, Ethernet, the IBM Enterprise System Connection (ESCON). In a preferred embodiment, host system 10 is a computer, such as a personal computer, workstation or mainframe, that is linked to the virtual tape server 110 via an ESCON channel. Virtual tape server 110, in an advantageous embodiment, is a computer, such as a personal computer, workstation or mainframe and is associated with a Direct Access Storage Device (DASD) cache 135. In a preferred embodiment, DASD cache 135 includes a plurality of hard disks that are spaced into redundant array of inexpensive disk (RAID) arrays.

Tape library 150 includes a plurality of tape drives, generally designated first, second and third tape drives 155a, 155b, 155c, such as the International Business Machine (IBM) Magstar 3590 tape drives. Generally, a removable storage volume, e.g., a tape cartridge, is loaded into each of the tape drives. Tape library 150 typically includes storage management software utilized to monitor the active space on the tape cartridges and schedule reclamations of tape cartridges when the system is less active. In an advantageous embodiment, tape library 150 is a tape library system such as the IBM Magstar 3494 Tape Library. Library manager 145 is utilized in virtual storage system 100 to install, maintain, configure, and operate tape library 150. Library manager 145 includes a controller (not shown), such as a personal computer or workstation that can assume direct control over tape library 150.

DASD cache 135 that includes, in an advantageous embodiment, a tape volume cache, provides a cache for data stored in tape library 150. DASD cache 135 maintains logical volumes as logical volume files that are concatenated into physical volume files in the tape cartridges loaded in the tape drives located within tape library 150. When a logical volume file in DASD cache 135 moves to a tape drive in tape library 150, the logical volume file is written to a physical volume file on a tape cartridge in the actual tape drive. When a physical volume file is recalled from a tape drive and moved to DASD cache 135, the physical volume file then becomes a logical volume file in the DASD cache 135. In this way, DASD cache 135 provides a window to host system 10 of all the physical volumes files in tape library 150.

Upon initialization, virtual tape server 110 loads a virtual tape controller 115 into random access memory (RAM). Virtual tape controller 115 includes a plurality of virtual tape daemons, generally designated first and second tape daemons 120a, 120b (for ease of explanation) that represent and emulate virtual tape devices to host system 10. Host system's 10 operating system, in turn, manages the presentation of the virtual tape devices to system users (not shown). Host system 10 views the virtual tape devices as actual tape drives and when host system 10 attempts to access a logical volume in a selected virtual tape device, the respective virtual tape daemon associated with the virtual tape device requested by host system 10 will handle the host access request.

A hierarchical storage management (HSM) client program 125 within virtual tape server 110 intercepts and processes the access request from the virtual tape daemons. HSM client 125 then carries out host system 10 request to access the logical volume file on DASD cache 135. In a preferred embodiment, HSM client program 125 is part of the IBM ADSTAR Distributed Storage Manager (ADSM) product. The ADSM provides generic client/server HSM functions and includes an ADSM client to handle file access requests with software integrated with the operating system kernel.

Virtual tape server 110 also includes a storage manager server 140 that handles data transfers between DASD cache 135 and tape library 150. For example, if HSM client 135 attempts to mount a logical volume file that is not located in DASD cache 135, HSM client 125 will communicate the access request to storage manager server 140. If the tape in the access request is already mounted in a tape drive in tape library 150, storage manager server 140 will access the physical volume for the requested logical volume file from the mounted tape. However, if the requested file on a tape is not presently mounted in a tape drive, storage manager server 140 will initiate a request to library manager 145 to mount the tape containing the physical volume corresponding to the requested logical volume file. In preferred embodiments, the storage manager server 140 is part of the IBM ADSM product described above.

In a preferred embodiment, storage manager server 140 migrates entire logical volume files from DASD cache 135 to tape library 150. When the available space in DASD cache 135 reaches a predetermined level or after a predetermined time period, an automated systems administrator 130 will direct storage manager server 140 to migrate logical volume files from DASD cache 135 to tape library 150 for archival therein. HSM client 125 will then substitute the migrated logical volume file with a stub file that includes all the information needed to locate and recall a physical volume file from tape library 150 that corresponds to the logical volume. However, when HSM client 125 attempts to access a stub file, HSM client 125 will request that storage manager server 140 recall the logical volume file from the physical volume in tape library 150 to replace the stub file in DASD cache 135. Typically, HSM client 125 would migrate the least used logical volume files.

An automated systems administrator 130 is included in virtual tape server 110 to perform operations that typically performed by a human system administrator. Automated system administrator 130 filters any error messages concerning tape library 150 that are generated by storage manager server 140 that, in turn, receives error information updates from library manager 145. Typically, automated system administrator 130 stores information associated with the physical volumes in an associated volume status table (not shown). Automated system administrator 130 also utilizes a premigration table (not shown) that maintains information on any logical volume files that are in the process of being premigrated from DASD cache 135 to tape library 150. During premigration, a logical volume file is locked while storage manager server 140 copies from the logical volume file in DASD cache 135 to tape library 150. The file name is placed in the premigration table to indicate that the logical volume file is presently in the process of being premigrated. Once the logical volume file is copied over to tape library 150, the logical volume file name is removed from the premigration table. At this point, the logical volume file is maintained in both DASD cache 135 and tape library 150. When the available space in DASD cache 135 reaches a predetermined low threshold, the logical volume files that have been premigrated, such that a copy is maintained in both DASD cache 135 and tape library 150, are deleted from DASD cache 135 and replaced with a stub file. The process of deleting the logical volume files from DASD cache 135 and replacing the moved files with a stub file is referred to herein as migration.

Figure 2A:
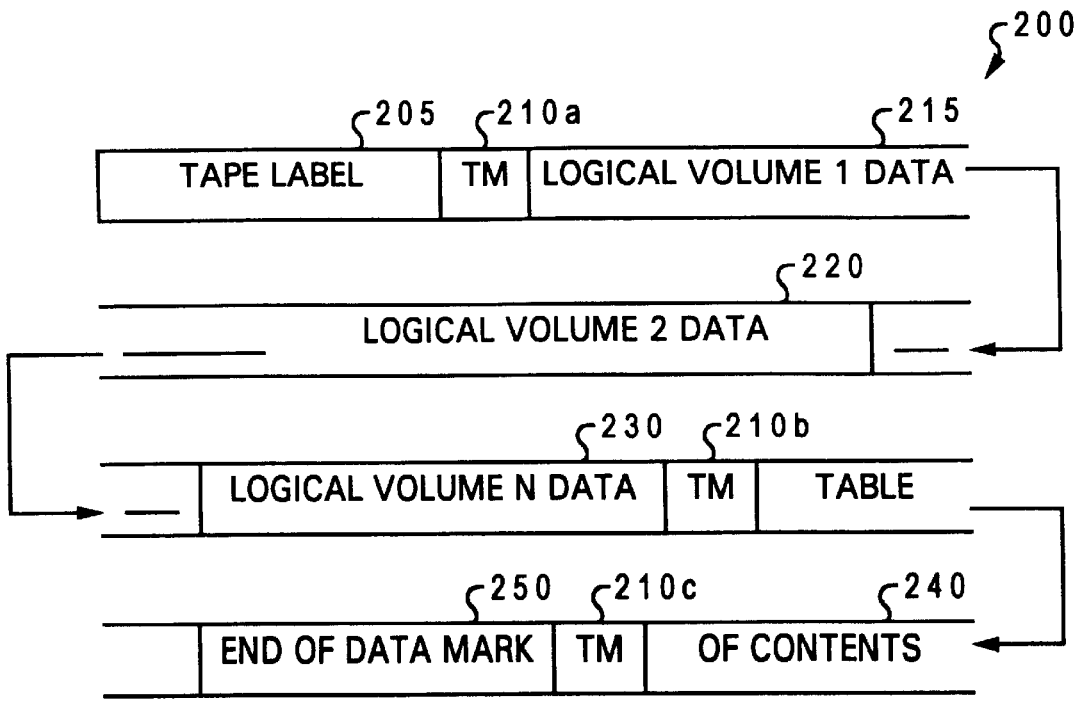
FIGS. 2A and 2B illustrate a simplified representation of an embodiment of an organization of contents in a removable storage volume according to the present invention.
Figure 2B:
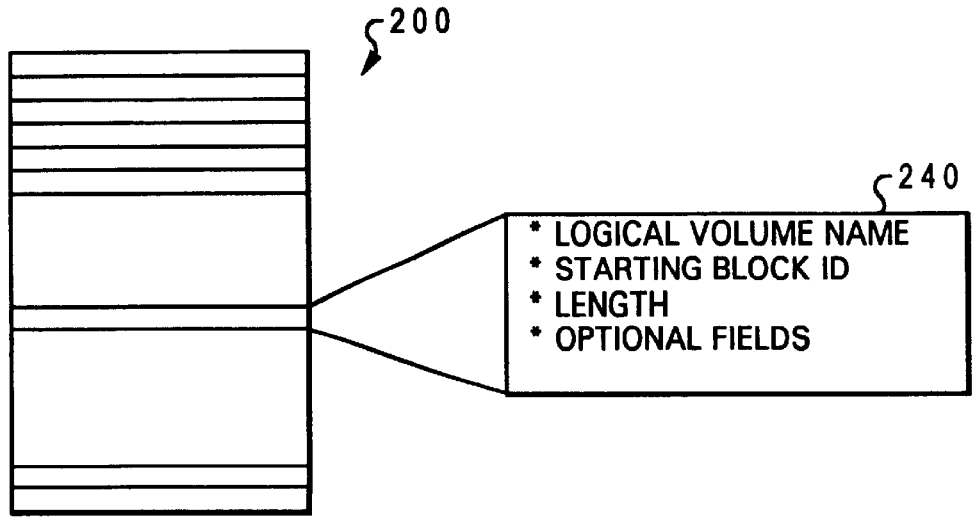

Referring now to FIGS. 2A and 2B, there are illustrated simplified representation of an embodiment of an organization of contents in a removable storage volume 200 according to the present invention. The formatting of the contents in the removable storage volume 200, such as magnetic tape, begins with a tape label 205 that uniquely identifies this particular removable storage volume, e.g., the volume serial number. A first tapemark 210*a*, e.g., a unique sequence of bits, separates tape label 205 from first logical volume data 215 that may contain data files corresponding to a particular customer or project. As shown in FIG. 2A, the removable storage volume also includes second logical volume data 220 up to N logical volumes data 230 followed by a second tapemark 210*b*, also known as a "filemark," to indicate the end of the logical volume data. Generally, data blocks, e.g., tape label 205 and first logical volume data, stored on a removable storage volume are organized in groups forming structures of two kinds: user-defined data sets or "data files" and "labels" that are a group of blocks that identify and describe the removable storage volume and/or a data file. The next contiguous block in the removable storage volume is a table of contents 240 that, in an advantageous embodiment, is a data file. A third tapemark 210*c* separates table of contents 240 from an end of data mark 250, i.e., end of volume indication, that may, for example, be two contiguous tapemarks.

Table of contents 240, as depicted in FIG. 2B, contains all the information required to identify the data files residing in the removable storage volume 200, such as logical volume name, i.e., logical volser, starting block or record identifier, the number of blocks or records (length) and optionally a timestamp record that indicates when the block or records was written to the removable storage volume 200. Table of contents 240 also includes the logical to physical volume links. In a preferred embodiment, table of contents 240 is written whenever removable storage volume 200 is closed and the information (discussed above) in table of contents 240 is generated from information that is already residing in an associated virtual storage system database. The virtual storage system database may be resident in a DASD cache associated with the virtual storage system or, alternatively, may be resident in a separate direct access storage device. Thus, when the removable storage volume is exported, i.e., transferred to another virtual storage system, the information in table of contents 240 can be read quickly and more efficiently, by the receiving virtual storage system to reconstruct the logical to physical volume links in the receiving virtual storage system database without having to read the entire content of the transferred removable storage volume or scan through the entire database if table of contents 240 was appended to the transferring virtual storage system database in an alternate embodiment. This results in faster operational readiness and enhances overall system performance.

Alternatively, in another advantageous embodiment, table of contents 240 is written to the stacked, i.e., mounted, removable storage volume whenever the stacked removable storage volume has been idle, i.e., not used, for a specified period of time. Thus, if an intervening system crash occurs before the removable storage volume is filled, a table of contents will still exist, even for a partially filled storage volume. The table of contents can then be used to update the virtual storage system database during the subsequent recovery operations. Utilizing the information in the table of contents to restore the crashed virtual storage system database instead of having to read each data file in the associated removable storage volume to obtain the necessary information results in faster recovery times and enhances system performance. The process of generating of a table of contents and the utilization of the table of contents in an import operation is described in greater detail hereinafter with respect to FIGS. 3 and 4, with continuing reference to FIGS. 1 and 2.

Referring now to FIG. 3, there is depicted a high-level process flow diagram 300 for writing to a removable storage volume utilizing the principles disclosed by the present invention. Process flow diagram 300 is initiated, as illustrated in step 310, when one or more logical volumes in DASD cache 135 is scheduled to be copied onto a data tape, i.e., removable storage volume, in tape library 150. The copying of a logical volume to a physical data tape may be necessitated if data in DASD cache 135 has reached a predetermined level. Storage manager server 140 will then select a data tape that is not full as depicted in step 315. After selecting a non-full data tape, storage manager server 140 will mount the data tape on one of the tape drives in tape library 150 and virtual storage system 110 will open it, as illustrated in step 320. Following the mounting of the selected data tape on a tape drive, as depicted in step 325, storage manager server 140 positions a read/write head in the tape drive to the end of the data in the data tape and backspaces one data file. The data tape is now positioned prior to the data tape's table of contents. Alternatively, in another advantageous embodiment, virtual tape server 110 may start at the beginning of the data tape and forward space to second tapemark 210*b*. Next, storage manager server 140 will migrate, i.e., copy, a logical volume file to the data tape. After the logical volume file has been written onto the data tape, process 300 determines if there is additional space available on the opened data tape for more logical volume files, as illustrated in decisional step 335. If process 300 determines if there is no more space available on the opened data tape, the opened data tape is marked as full, as depicted in step 340. After the opened data tape is marked as full, the associated table of contents in the opened data tape is updated, i.e., information regarding the newly migrated logical volume is added to the table of contents, and the opened data tape is closed and demounted, i.e., archived, as illustrated in step 365.

Returning back to decisional step 335, if process 300 determines that there is more space available on the opened data tape for more data files, another determination is made, as depicted in decisional step 345, to ascertain if there are more logical volumes that need to be copied onto the opened data tape. If there is another logical volume that needs to be copied, process 300 proceeds to step 330 to initiate another copying operation. However, if process 300 determines that there are no more logical volumes queued for migration, process 300 resorts to an idle state for a predetermined period of time, as illustrated in step 350.

After waiting for the specified period of time, process 300 again checks to see if another logical volume is scheduled to be migrated from DASD cache 135 to the opened data tape, as depicted in decisional step 355. If there is another logical volume scheduled to be migrated to the opened data tape, process 300 proceeds back to step 330 to initiate another copying operation. If, on the other hand, process 300 determines that there is no logical volume in DASD cache 145 required to be migrated to the opened data tape, process 300 makes another determination, as illustrated in decisional step 360, to ascertain if the opened data tape has been idled for a predetermined period of time.

The predetermined period of time may, in an advantageous embodiment, be a set number of wait cycles. It should be noted that the present invention does not contemplate limiting its practice to any one set period of idle time or a specific number of wait cycles. If process 300 determines that the opened data tape has not been idled for the specified period of time, process 300 proceeds back to step 350, where process 300 reverts back to an idle state for the specified period of time. If, however, process 300 determines that the opened data tape has been idled for a period equal to or greater than the predetermined waiting period, process 300 proceeds on to step 365 discussed previously, where the associated table of contents in the opened data tape is updated with the information uniquely identifying all newly copied logical volumes. After the table of contents have been updated, the opened data tape is then closed and demounted and process 300 is terminated, as depicted in step 370.

Figure 4:
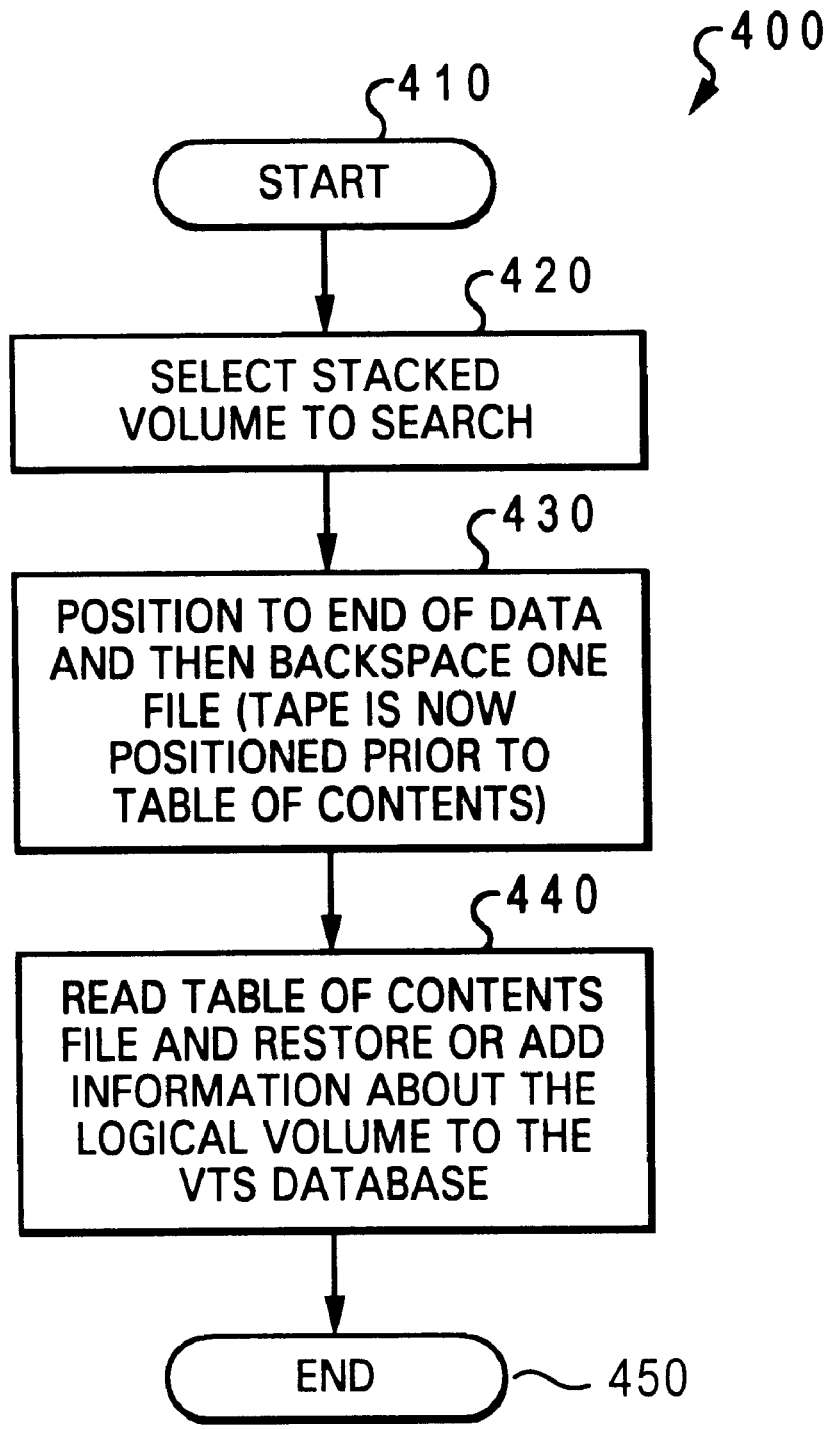
FIG. 4 illustrates a process flow diagram for importing a data tape into a virtual storage system from another virtual storage system according to the present invention.

Referring now to FIG. 4, there is illustrated a process flow diagram 400 for importing a data tape into a virtual storage system from another virtual storage system according to the present invention. Process 400 is initiated, as illustrated in step 410, when a data tape is transferred from one virtual storage system to another. The receiving virtual storage system mounts and opens the data tape utilizing one its available tape drives in its tape library, as depicted in step 420. The receiving virtual storage system then opens and positions the data tape to its end of the data field and backspaces one data file. Alternatively, in another advantageous embodiment, the receiving virtual tape server may start at the beginning of the data tape and forward space to the table of contents file. The opened data tape is now positioned at the beginning of the opened data tape associated table of contents, as illustrated in step 430. Process 400 then reads the table of contents and copies the information that uniquely identifies the data files recorded in the data tape to the receiving virtual storage system database, as depicted in step 440, with the process ending at step 450.

Alternatively, in another advantageous embodiment, process 400 may also be used to more efficiently restore a virtual storage system database following, for example, a system crash that had corrupted or erase the contents in the virtual storage system database. In this alternate embodiment, following a system crash, each of the data tapes in an associated tape library is mounted and opened. The table of contents in each data tape is then read and copied to the virtual storage system database to restore the information that had been lost or corrupted. Having to only read a single data file, i.e., table of contents, in each data tape instead of having read all the data files in each data tape to recover the information lost in the virtual storage system's database results in a shorter recovery operation from a system crash that ultimately enhances overall system performance and reliability.

It should be noted that although the present invention has been described, in one embodiment, in the context of a computer system, those skilled in the art will readily appreciate that the methods of the present invention described hereinabove may be implemented, for example, by operating storage manager server 140 or other suitable electronic module to execute a corresponding sequence of machine-readable instructions. These instructions may reside in various types of signal-bearing media. In this respect, one aspect of the present invention concerns a programmed product, that includes signal-bearing media tangibly embodying a program of machine-readable instructions executable by a digital data processor to perform the methods described above. The present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links and wireless.

While the invention has been particularly shown and described with reference to a preferred embodiment, it will be understood by those skilled in the art that various changes in form and detail may be made therein without departing from the spirit and scope of the invention.

What is claimed is:

1. A method for efficiently importing/exporting a removable storage volume from a first virtual storage system to a second virtual storage system, said method comprising the steps of:

writing a table of contents to the end of said removable storage volume in said first virtual storage system, wherein said table of contents identifies a plurality of data files located in said removable storage volume, and wherein said table of contents for each and every said data file in said plurality of data files is stored only at an end location on said removable storage volume, said end location being reserved as the exclusive location for storing said table of contents for each and all of said plurality of data files, and wherein any previous table of contents stored on said removable storage volume is overwritten when new data files are written to said removable storage volume;

transferring said removable storage volume to said second virtual storage system; and updating a database in said second virtual storage system utilizing said table of contents without having to read each of said plurality of data files.

2. The method as recited in claim 1, wherein said table of contents for each said data file further includes a timestamp for each said data file.

3. The method as recited in claim 1, wherein said step of writing a table of contents to the end of a removable storage volume is initiated after a pre-determined period of time that said removable storage volume is idle.

4. The method as recited in claim 1, wherein said table of contents is constructed utilizing information residing in a database in said first virtual storage system.

5. The method as recited in claim 1, wherein said removable storage volume is a data tape.

6. A virtual storage system comprising:

a direct access storage device;

a plurality of removable storage volumes, operatively coupled to said direct access storage device to receive data; and a storage manager, coupled to said direct access storage device and said plurality of removable storage volumes, wherein said storage manager writes a table of contents to the end of a removable storage volume, said table of contents identifying a plurality of data files in said removable storage volume, and wherein said table of contents for each said data file in said plurality of data files is stored only at an end location on said removable storage volume, said end location being reserved as the exclusive location for storing said table of contents for all of said plurality of data files, and wherein any previous table of contents stored on said removable storage volume is overwritten when new data files are written to said removable storage volume.

7. The virtual storage system as recited in claim 6, wherein said table of contents for each said data file further includes a timestamp for each said data file.

8. The virtual storage system as recited in claim 6, wherein said table of contents is written to the end of said removable storage volume after a pre-determined period of time that said removable storage volume is idle.

9. The virtual storage system as recited in claim 6, wherein said table of contents is constructed utilizing information residing in a database in said virtual storage system.

10. The virtual storage system as recited in claim 6, wherein said removable storage volume is a data tape.

11. A method for formatting a data tape that allows for efficient importing/exporting of said data tape first from a virtual storage system to a second virtual storage system, said method comprising the steps of:

writing a plurality of data files to said data tape;

utilizing a plurality of filemarks to separate said plurality of data files from each other; and writing a single table of contents for all data files on said data tape at the end of said data tape, wherein any previous table of contents stored on said data tape is overwritten when new data files are written to said data tape, and wherein said table of contents is utilized to identify said plurality of data files in said data tape allowing said second virtual storage system to update a database in said second virtual storage system without having to read any of said plurality of data files in said data tape.

12. A computer program product, comprising:

a computer-readable medium having stored thereon computer executable instructions for implementing a method for efficiently importing/exporting a removable storage volume from a first virtual storage system to a second virtual storage system, said computer executable instructions when executed perform the steps of:

writing a table of contents to the end of said removable storage volume in said first virtual storage system, and wherein any previous table of contents stored on said removable storage volume is overwritten when new data files are written to said data tape;

transferring said removable storage volume to said second virtual storage system; and updating a database in said second virtual storage system utilizing said table of contents without having to read each of said plurality of data files.

13. The computer program product as recited in claim 12, wherein said table of contents for each said data file further includes a timestamp for each said data file.

14. The computer program product as recited in claim 12, wherein said step of writing a table of contents to the end of a removable storage volume is initiated after a pre-determined period of time that said removable storage volume is idle.

15. The computer program product as recited in claim 12, wherein said table of contents is constructed utilizing information residing in a database in said first virtual storage system.

16. The computer program product as recited in claim 12, wherein said removable storage volume is a data tape.

* * * * *

UNITED STATES PATENT AND TRADEMARK OFFICE
CERTIFICATE OF CORRECTION

PATENT NO.    : 6,816,941 B1                                       Page 1 of 1
DATED         : November 9, 2004
INVENTOR(S)   : Carlson et al.

It is certified that error appears in the above-identified patent and that said Letters Patent is hereby corrected as shown below:

Column 10,
Line 18, insert the following after the word "wherein" and before the word "any":

-- said table of contents for each and every said data file in said plurality of data files is stored only at an end location on said removable storage volume, said end location being reserved as the exclusive location for storing said table of contents for all said plurality of data files, and wherein --.

Signed and Sealed this

Eighteenth Day of October, 2005

JON W. DUDAS
*Director of the United States Patent and Trademark Office*